June 26, 1934.  D. F. NEWMAN  1,964,476
FREEZING TRAY
Filed April 13, 1931
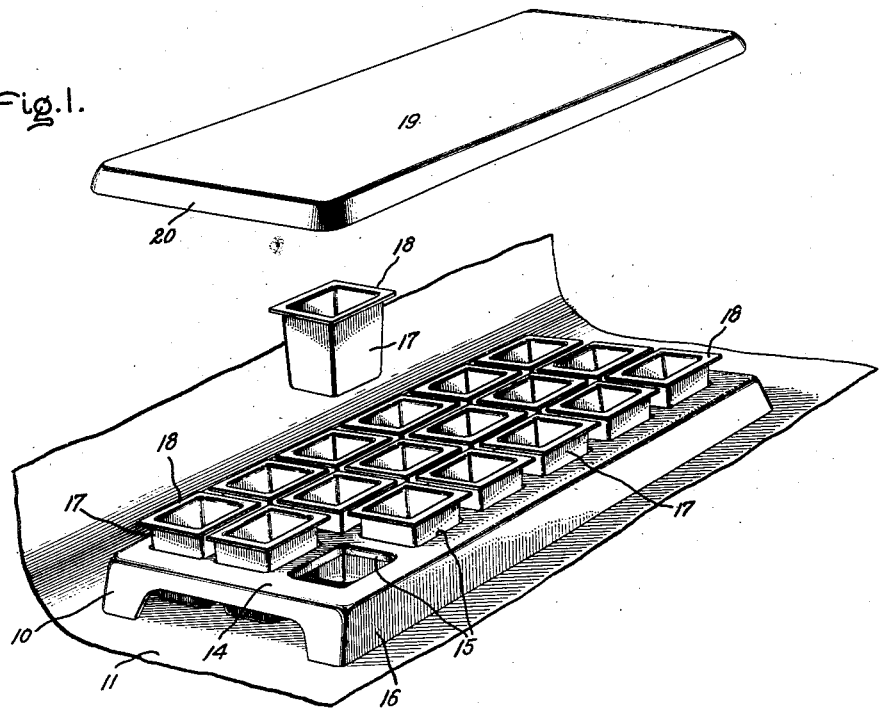
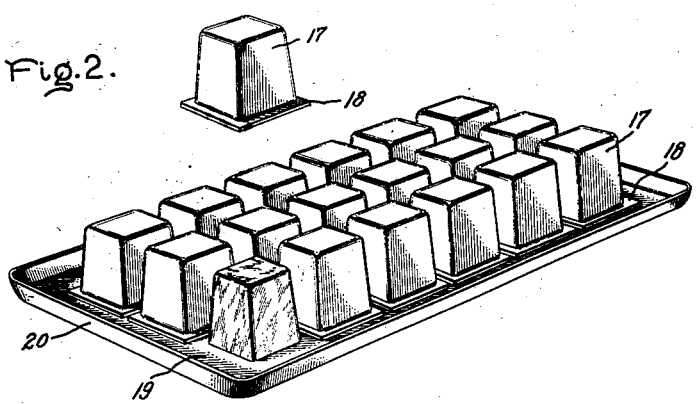
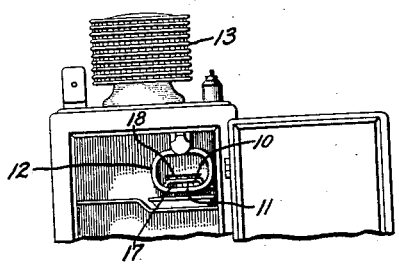
Inventor:
Delbert F. Newman,
by Charles E. Tullar
His Attorney.

Patented June 26, 1934

1,964,476

UNITED STATES PATENT OFFICE 1,964,476

FREEZING TRAY

Delbert F. Newman, Schenectady, N. Y., assignor to General Electric Company, a corporation of New York Application April 13, 1931, Serial No. 529,688

3 Claims. (Cl. 62—108.5)

My invention relates to freezing trays of the type ordinarily employed in the cooling units of refrigerators having refrigerating systems for cooling them.

It has been the practice heretofore in making freezing trays of this character to provide a unitary tray having a plurality of cups for freezing water placed therein. In the ordinary process of manufacture neither the surface of the cooling unit on which the freezing tray is placed, nor the bottom of the ice tray is perfectly flat. As a result, when the freezing tray is placed in the cooling unit, it comes in contact with the cooling unit at a few points only, and the other portions of the tray are not in contact with the surface of the cooling unit which greatly impairs the conduction of heat from the tray to the cooling unit and increases the time required to freeze the substance placed in the cups. Moreover, in providing separate cups supported in a frame it has also been the practice to fit cups directly in the frame so that the cups were in contact with the frame when the frame and cups were placed on the surface of the cooling unit. This resulted in the cups being frozen to the frame which made it difficult to remove the cups therefrom.

An object of my invention is to provide a freezing tray in which each of the cups thereof will rest directly on the surface of the cooling unit independently of the others, so that all of the cups will be in good thermal contact with the cooling unit. I accomplish this by providing a freezing tray comprising a frame having a plurality of openings therein, a support for retaining the frame above the surface of the cooling unit, a plurality of separate cups loosely arranged in the openings in said frame so that they rest independently of each other on the surface of the cooling unit, and forming the cups in such manner that they engage the frame to support the containers therein when the frame is removed from the cooling unit.

Another object of my invention is to provide a freezing tray of this type in which freezing of the cups to the frame will be avoided.

My invention will be more fully set forth in the following description referring to the accompanying drawing and the features of novelty which characterize my invention will be pointed out with particularity in the claims annexed to and forming part of this specification.

In the drawing, Fig. 1 is a perspective view of a freezing tray embodying my invention arranged on the surface of a cooling unit, the cover being shown above the tray and one of the cups removed from the frame; Fig. 2 is a perspective view of the cups or containers placed in an inverted position on the cover of the tray, one of the cups being removed from an ice cube frozen therein, and Fig. 3 is a front elevation of a refrigerator cabinet having an ice tray of my improved construction arranged in the cooling unit.

Referring to the drawing, in Figs. 1 and 3 I have shown a freezing tray 10 embodying my invention arranged on the surface 11 of the cooling unit 12 having a suitable refrigerating system indicated at 13 associated therewith. In order to insure good thermal contact between each of the cups of the freezing tray and the surface of the cooling unit, I make the freezing tray of a frame 14 having a plurality of openings 15 therein. The frame 14 is supported above the surface 11 of the cooling unit in any suitable manner, but I prefer to support the frame in this way by forming a downturned flange 16 thereon which rests on the surface of the cooling unit. A plurality of separate cups 17 are loosely arranged in the openings 15 and spaced from the frame, so that each of the cups rests on the surface of the cooling unit independently of the others and the frame, and is therefore in good thermal contact with the surface of the cooling unit. The cups 17 are provided with portions above the frame and spaced therefrom which are adapted to engage the frame and support the cups therein when the frame is removed from the surface of the cooling unit. The desired spacing of the cups from the frame is obtained by making the vertical distance from the portions of the cups which engage the frame to the bottoms of the cups substantially greater than the vertical distance between the top of the frame and the surface 11 of the cooling unit 12 on which they are supported. I have found it convenient to form these portions for engaging the frame in this way by providing flanges 18 extending about the upper edges of the cups. The flanges 18 on the cups extend above the frame and are spaced from the upper surface thereof, and this relation is obtained by making the vertical distance from the flanges to the bottoms of the cups substantially greater than the distance from the top of the frame to the surface 11 of the cooling unit on which the frame is supported. The cups 17 are all of substantially the same height and the cover 19 having a downturned flange 20 about the edge thereof is placed on the cups.

It will be understood that by constructing the freezing tray as above described when the frame with the cups therein is placed on the surface of the cooling unit, the frame is supported above the surface of the cooling unit and the cups will be loosely arranged in the openings and entirely spaced from the frame, so that each of the cups rests on the surface of the cooling unit independently of the others and the frame. When the freezing tray is removed from the cooling unit the frame will engage the flanges 18 on the cups 17 and retain the cups therein so that the freezing tray and cups can be conveniently removed from the cooling unit. When the freezing tray is removed from the cooling unit the downturned flange 20 on the cover rests on the frame. In order to facilitate removing the ice cubes from the cups, I ordinarily prefer to place the cups in a pan of water for a short time, or invert the cups with the frame on the cover and allow the water to flow over the cups so as to loosen the blocks frozen in the cups. The frame is then removed from the cups as shown in Fig. 2 and the cups can be easily removed from the blocks frozen therein.

Although I have shown a particular embodiment of my invention, I do not desire to be limited thereto, and I intend in the appended claims to cover all modifications which do not depart from the spirit and scope of my invention.

What I claim as new and desire to secure by Letters Patent of the United States is:

1. A freezing tray comprising a frame having a plurality of openings therein, a support for retaining the frame above the surface on which the same is placed, a plurality of separate cups loosely arranged in the openings in said frame so that they rest on the surface on which said frame is placed independently of each other and said frame, and portions of said cups above and spaced from said frame being arranged to engage said frame to support said cups therein when said frame is removed from the support.

2. An ice tray comprising a frame having a plurality of openings therein and a flange arranged to support the frame above the surface on which the same is placed, a plurality of cups loosely arranged in the openings in said frame and spaced therefrom so that each of them will rest on the surface supporting said frame independently of each other and said frame, and flanges on said cups above and spaced from said flanges on said cups above and spaced from said frame being arranged to engage said frame to support said cups therein when said frame is removed from said support.

3. A freezing tray comprising a frame having a plurality of openings therein, a support for retaining the frame above the surface on which it is placed, a plurality of separate cups loosely arranged in the openings in said frame, each of the cups having portions arranged to engage the frame to support said cups therein when said frame is raised from the surface, the vertical distance between the lower surfaces of the portions and the bottoms of the cups being substantially greater than the vertical distance between the top of the frame and the bottom of the support.

DELBERT F. NEWMAN.